United States Patent
Dalinkiewicz

[11] Patent Number: 5,906,410
[45] Date of Patent: May 25, 1999

[54] ANCHOR PLATE

[75] Inventor: Nicholas Dalinkiewicz, St. Albans, Australia

[73] Assignee: Telstra Corporation Limited, Melbourne, Victoria, Australia

[21] Appl. No.: 08/948,907

[22] Filed: Oct. 10, 1997

Related U.S. Application Data

[62] Division of application No. 08/488,610, Jun. 8, 1995, abandoned.

[51] Int. Cl.$^6$ .................................................. B62D 27/02
[52] U.S. Cl. ............................................. 296/189; 411/84
[58] Field of Search .................................. 296/24.1, 189, 296/30; 293/133, 155; 280/847, 805; 248/548, 900; 403/2; 411/84; 410/129, 142, 143; 188/374–377, 371

[56] References Cited

U.S. PATENT DOCUMENTS

| | | | |
|---|---|---|---|
| 856,245 | 6/1907 | Gamon | 411/84 |
| 1,533,764 | 4/1925 | Schlatter et al. | 293/155 X |
| 1,835,710 | 12/1931 | Jenkins et al. | 411/84 |
| 3,574,376 | 4/1971 | Cummins | 280/805 X |
| 3,694,028 | 9/1972 | Andres et al. | 188/374 X |
| 3,697,108 | 10/1972 | Diener | 188/371 X |
| 4,035,014 | 7/1977 | Sellers | 296/24.1 |
| 4,703,669 | 11/1987 | Hyodo | 188/371 X |
| 4,823,923 | 4/1989 | Moyer | 188/375 X |
| 4,929,008 | 5/1990 | Esfandiary | 188/376 X |
| 4,964,666 | 10/1990 | Dillon | 296/24.1 |
| 5,258,893 | 11/1993 | Finneyfrock | 280/748 X |
| 5,620,218 | 4/1997 | Saltzman et al. | 293/155 X |

FOREIGN PATENT DOCUMENTS

| | | | |
|---|---|---|---|
| 556667 A1 | 2/1993 | European Pat. Off. | B62D 25/08 |
| 121147 | 6/1985 | Japan | 293/133 |
| 2-269236 | 11/1990 | Japan | 41/84 |
| 1487353 | 10/1974 | United Kingdom | B62D 53/00 |
| 672080 | 7/1979 | U.S.S.R. | 188/374 |

*Primary Examiner*—Dennis H. Pedder
*Attorney, Agent, or Firm*—Blakely Sokoloff, Taylor & Zafman

[57] ABSTRACT

An anchor plate (2) mounted on the outside (15) of an inner vehicle body panel (8) having an elongate member with first, second and third holes (22,24,26) aligned on the plate (2), the second hole (22) being disposed between the first and third holes (24,26), and closer to the first hole (24) than the third hole (26), the first hole (24) being directed to the front of the vehicle and the third hole (26) being directed to the rear of the vehicle. First, second and third nuts (32,34,36) are aligned with the first, second and third holes (22,24,26), respectively, for receiving respective bolts and screws (16, 18,20) which fix the anchor plate (2) to the inner vehicle body panel (8). The anchor plate (2) is mounted by forming an insertion hole in the body panel (8), inserting the plate (2) through the insertion hole, positioning the plate (2) in a forward position on the outside (15) of the body panel (8) relative to the insertion hole, forming holes corresponding to the holes (22,24,26) of the anchor plate (2) in the forward position, and inserting the bolts and screws (16,18,20) from the inside of the body panel (8) so as to affix the plate (2) thereto.

9 Claims, 5 Drawing Sheets

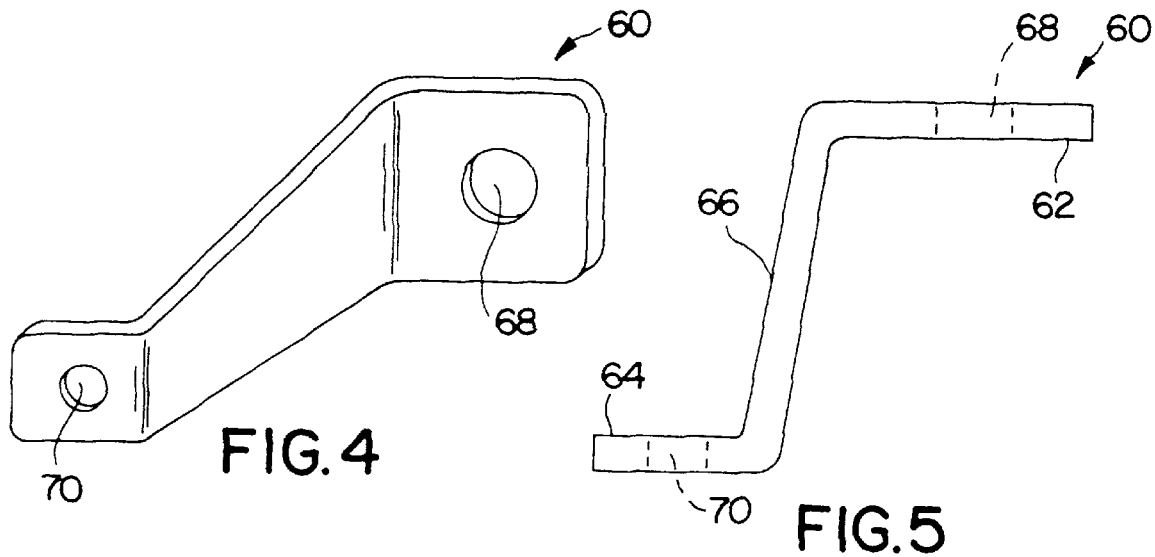
FIG. 4
FIG. 5
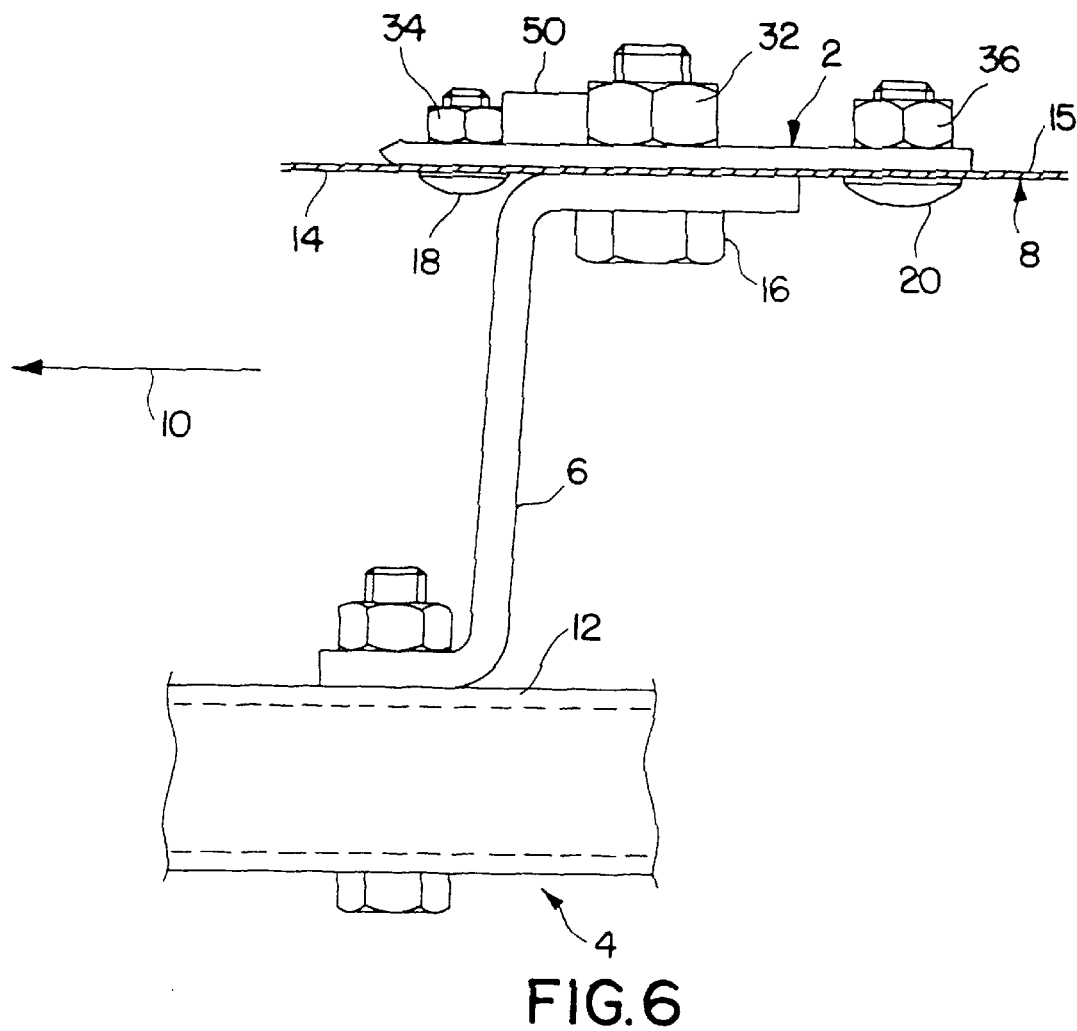
FIG. 6

5,906,410

ANCHOR PLATE

This is a divisional of application Ser. No. 08/488,610, filed Jun. 8, 1995, now abandoned.

FIELD OF THE INVENTION

The present invention relates to an anchor plate which is particularly, but not exclusively, useful for anchoring a load carrying vehicle fitting.

BACKGROUND OF THE INVENTION

Vehicle fittings, such as load carrying frames, need to be mounted securely to a vehicle body, and the body generally includes inner and outer body panels. For internal fittings secured to the inner panel, anchorage of the fitting should be such that it is able to withstand impact from a load in the event of a vehicle collision. This is a requirement for load carrying frames which need to absorb the energy of rapidly decelerating loads under impact conditions. Anchor plates used to secure the fittings should not become dislodged from the inner body panel on impact of a load which the fitting is intended to restrain.

SUMMARY OF THE INVENTION

In accordance with the present invention there is provided an anchor plate for a vehicle fitting, comprising an elongate plate member including first, second and third holes aligned on the plate and for receiving respective means for fixing the plate to a vehicle body panel, said second hole being disposed between said first and third holes, and closer to the first hole than the third hole.

The present invention also provides an anchor plate mounted on the outside of an inner vehicle body panel, said plate including:

an elongate member having first, second and third holes aligned on the plate, said second hole being disposed between said first and third holes, and closer to the first hole than the third hole, and said first hole being directed to the front of the vehicle and the third hole being directed to the rear of the vehicle; and first, second and third nuts aligned with the first, second and third holes, respectively, for receiving respective fixing means which fix the anchor plate to said inner vehicle body panel.

The present invention also provides a method of mounting the anchor plate, comprising forming an insertion hole in an inner vehicle body panel, inserting the plate through the insertion hole, positioning the plate in a forward position on the outside of the inner vehicle body panel relative to the insertion hole, forming holes corresponding to the holes of the anchor plate in said forward position, and inserting the fixing means from the inside of the vehicle body panel so as to affix the plate thereto.

The present invention further provides a load restraint system which includes the anchor plate, a load carrying frame, and a load securing bracket which is affixed at one end to the load carrying frame and affixed to the other end to the inside of said inner vehicle body panel by fixing means inserted into said second hole and nut of the anchor plate.

BRIEF DESCRIPTION OF THE DRAWINGS

Preferred embodiments of the present invention will now be described hereinafter, by way of example only, with reference to the accompanying drawings, wherein:

FIG. 4 is a perspective view of a load securing bracket for use with the anchor plate;

FIG. 5 is a side view of the load securing bracket;

FIG. 6 is a cross-sectional plan view of part of a load restraint system using the anchor plate;

DETAILED DESCRIPTION OF PREFERRED EMBODIMENTS OF THE INVENTION

Figure 1:
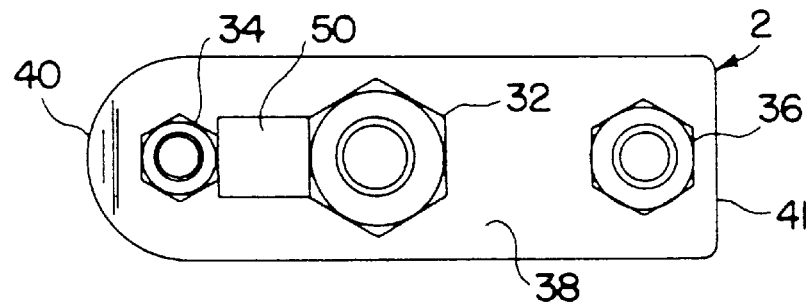
FIG. 1 is a plan view of a preferred embodiment of an anchor plate with a bolt and screws therefor inserted therein.

An anchor plate 2, as shown in the Figures, has been designed specifically for use in a load restraint assembly for a vehicle, but can also be used or adapted for mounting fittings in other locations. The load restraint system, as shown in FIG. 6, includes a load carrying frame 4 which is mounted by a load securing bracket 6 to the inner body panel 8 of a vehicle using the anchor plate 2. The load carrying frame 4 sits inside the vehicle behind the position of the vehicle driver, who is located in the forward direction indicated by the arrow 10. The frame 4 intended to protect the driver from being stuck by a load placed behind the frame 4 in a load carrying part of the vehicle. The sides 12 of the frame 4 are affixed to the inside 14 of the inner body panel 8 by bolting the load carrying bracket 6 attached thereto to the panel 8 with a load carrying bolt 16. The load bolt 16 is screwed into the anchor plate 2 which is mounted behind and on the outside of the inner body panel 8. Although the anchor plate 2 has been designed for mounting to the inner panel of the upper cant rail of a vehicle, it can be used for fixing the load carrying frame 4 to other locations within the vehicle, such as the vehicle floor.

The impact force which the load carrying frame 4 must restrain on a vehicle collision is imparted on the frame generally in the direction indicated by the arrow 10, which in turn imparts a similar force on the load carrying bolt 16 via the bracket 6. An impact force directed along the shaft of the bolt 16 is also imparted on the bolt 16 by the bracket 6. The anchor plate 2 needs to assist in restraining these forces as much as practically possible. The anchor plate 2 will fail to restrain the impact forces if it tears through and out of or is pulled from the panel 8.

The dimensions recited hereinafter may vary by ±10 mm, except for the plate thickness ;which may vary by ±1 mm, depending on the vehicle for which the anchor plate 2 is to be used.

Figure 2:
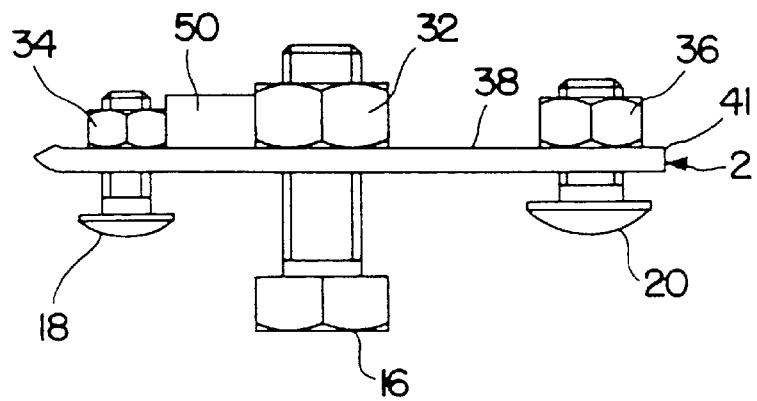
FIG. 2 is a side view of the anchor plate with the bolt and screws.
Figure 3:
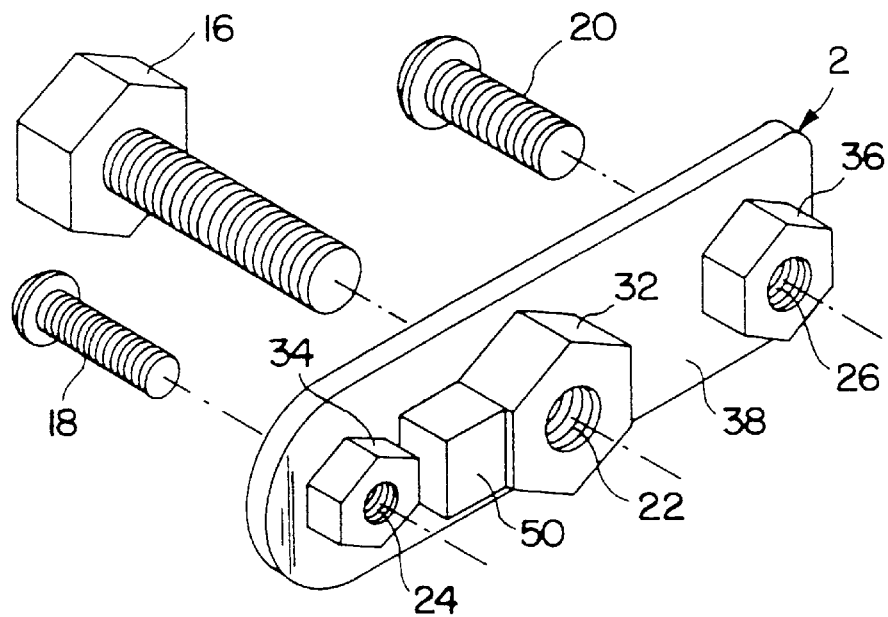
FIG. 3 is a perspective view of the anchor plate and the bolt and screws therefor.

The anchor plate, as shown in FIGS. 1 to 3, has a length of 80 mm, a width of 25 mm and a thickness of 3 mm. The plate thickness is effectively matched to the thickness of the vehicle body panel 8. Approximately, a 3 to 1 thickness ratio gives optimum performance as under sever load conditions, the plate 2 is allowed to deform with the body panel 8. A thicker plate provides excessive stiffness which causes the plate to pierce the body prematurely, whereas a thinner plate lacks the strength to carry high loads. The plate size is consistent with constraints imposed by a vehicle cant rail. A smaller size plate will have a lower load carrying capacity, whereas a larger plate will require an excessively large opening to be cut into the body panel 8 in order to insert the plate 2 behind the panel 8. The plate 2 should be inserted behind the body panel 8 on the outside 15 thereof by using a hole which is drilled at least 50 mm behind the position where the plate 2 will eventually be mounted. Any deformation or tearing of the panel 8 under load impact will occur in the forward direction 10. Therefore to prevent the anchor plate 2, and its bolt 16 and mounting screws 18 and 20 from meeting the insertion hole, the hole must be located behind the mounting position of the plate 2. The plate 2 is formed of galvanised mild steel.

The plate 2 includes three holes 22, 24 and 26 which are used to receive the load bolt 16, a first mounting screw 18, and a second mounting screw 20, respectively. The bolt 16 and the screws 18 and 20 are held by respective nuts 32, 34 and 36. The screws are Unbrako™ socket screws produced by Unbrako Pty. Ltd. of Melbourne, Australia or equivalent. The nuts 32 to 36 are anti-vibration nuts which are brazed or welded to the top 38 of the plate 2. This ensures the load carrying bolt 16 and the screws 18 and 20 do not vibrate loose whilst in service. Preferably the nuts are Conelock™ nuts although other commercially available nuts, such as Nylock™ nuts, can be used for the same purpose. Conelock™ and Nylock™ nuts are distributed in Australia by J. Blackwood & Son of Sydney, Australia. The latter nuts however include nylon inserts which may be damaged when the nuts are brazed or welded into the plate 2.

The diameters of the holes 22 to 26 and their respective nuts 32 to 36 which are aligned therewith, match the diameters of the threads of the respective load bolt 16 and screws 18 and 20.

The load bolt 16 and nut 32 have the largest diameter, between M10 and M12, preferably M10, and is offset towards the front end 40 of the plate 2. The mounting screws 18 and 20 are used to affix the plate 2 to the body panel 8, and the front screw 18 and nut 34 have a diameter between M5 to M8, preferably M6, whereas the diameter of the rear mounting screw 20 and its respective nut 36 is larger, between M6 to M10, preferably M8. The centre of the front nut 34 is 11.5 mm from the tip of the front end 40, the centre of the load nut 32 is 36.5 mm from the tip of the front end 40, and the centre of the back nut 36 is 70.5 mm from the tip.

Figure 7:
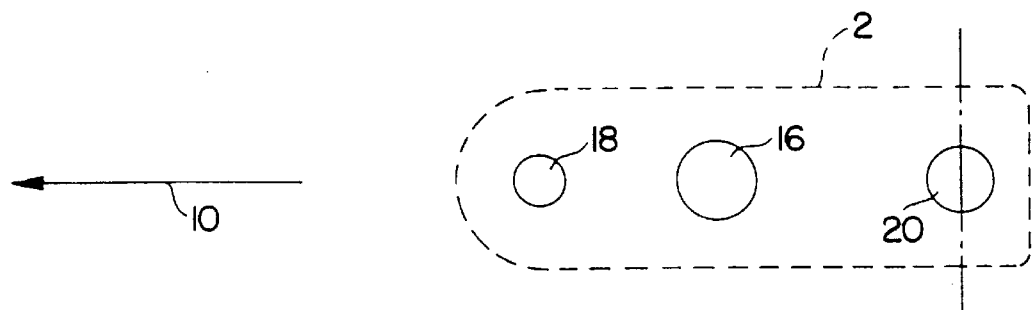
FIGS. 7 to 10 are schematic diagrams illustrating tearing of a vehicle body under load impact conditions by the anchor plate and the bolt and screws therefor.
Figure 8:
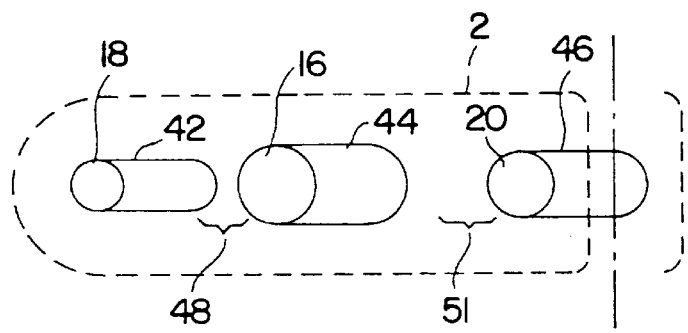

The differences between the diameters of the bolt 16 and screws 18 to 20 and the nuts 32 to 36 of the anchor plate 2 are illustrated schematically in FIG. 7, which also shows the spatial offset of the load bolt 16 relative to the front screw 18 and the rear screw 20. The diameters and relative positioning of the holes 22 to 26, nuts 32 to 36 and the bolt 16 and the screws 18 to 20 has been chosen to assist in retaining the plate behind the panel 8 under load impact conditions. When a rapid decelerating load applied to the load restraint system exceeds the capacity of the system, the plate 2 will begin to move in the forward direction 10, corresponding to the general direction of the impact force on the load carrying frame 4. The bolt 16 and screws 18 and 20 will begin tear through the panel 8, as shown in FIG. 8, as the plate 2 moves forward. The front screw 18 creates a thin leading slot 42 in the panel 8. The load bolt 16 produces the widest slot 44 and the rear screw 20 produces a slot 46 of a size which is between that of the other two slots 42 and 44. The largest concentration of applied force is in the region 48 between the load bolt 16 and the front slot 42. Due to the offset between the load bolt 16 and the rear screw 20, the force imparted on the region 51 in front of the back screw 20 is reduced, thereby assisting in preventing the back or rear end 41 of the anchor plate 20 from being pulled out and tearing through the body panel 8. By reducing the tendency for the rear end 41 of the plate 2 to pull out, the production of a wider slot 46 by the rear screw 20 can be tolerated. A larger diameter rear mounting screw 20 is therefore used to provide a greater clamping force between the rear of the plate and the body panel 8, which consequently increases the load carrying capacity of the anchor plate 2.

Figure 9:
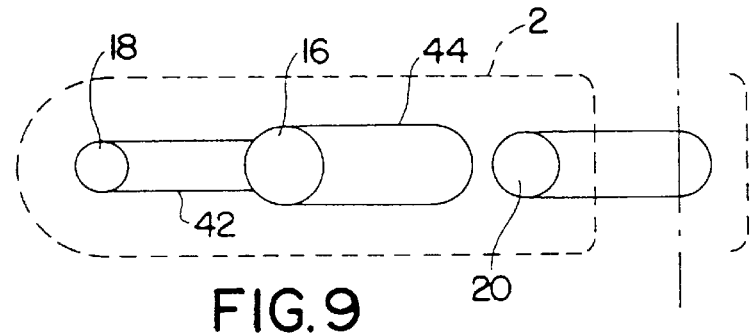
Figure 10:
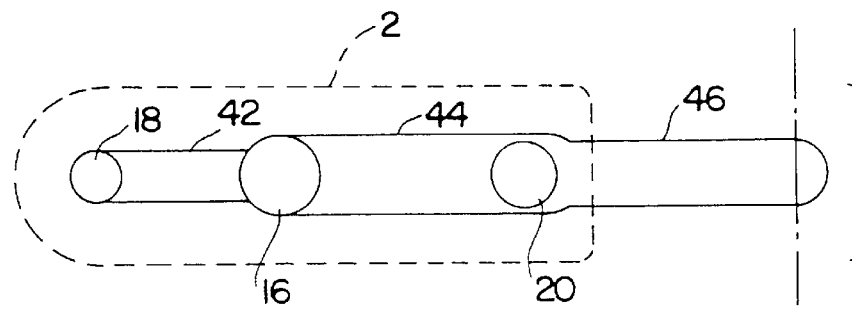

As tearing of the panel 8 progresses, as shown in FIG. 9, the load bolt 16 will meet the forward slot 42 of the front screw 18, yet due to the offset, there is still no separation of metal between the rear screw 20 and the slot 44 produced by the load bolt 16. Consequently, the plate 2 remains secured behind the body panel 8. Eventually the rear screw 20 will meet the slot 44 produced by the load bolt 16, as shown in FIG. 10, yet the anchor plate 2 will probably still remain behind the body panel 8 because:

1. By this time considerable energy has been absorbed and the magnitude of the decelerating load has decreased significantly which should allow the plate 2 to remain behind the panel 8 until the load has come to rest.
2. The slots or tears 42 to 46 produced in the panel 8 are relatively thin.
3. The nuts 32 to 36 braised or welded to the anchor plate provide local stiffness to the plate 2, yet the plate 2 is still free to deform under load and follow the contour of the body panel 8. Deformation of the plate 2 almost entirely occurs between the nuts 32 to 36. The ability to deform in this manner is beneficial as the plate will not readily pierce the body panel, and the locally stiff regions resist any tendency of the plate 2 to deform to such an extent that it is pulled out of the body panel through the slots 42 to 46.

As long as the plate 2 remains behind the body panel 8, the load continues to be restrained.

The front of the plate in the region of the front screw 18 of the load bolt 16 is subjected to high stresses under load impact conditions and is prone to excessive deformation. This can be resisted by ensuring the front of the plate 2 has sufficient stiffness to resist deformation, yet again if there is too much stiffness, the plate 2 will pierce the body panel 8. On the other hand, if there is too much deformation, the plate embeds itself into the deformed panel 8 and no further tearing of the panel 8 occurs, which will lead to the plate being pulled out of the body panel 8. A metal bridge 50 connects the front nut 34 and the load nut 32. The bridge 50 is brazed or welded to the plate and/or the nuts 32 to 36. The bridge 50 provides the plate 2 with graded stiffness. As an impact load is applied, the bridge 50 provides the front of the plate 2 with greater stiffness to resist deformation and therefore facilitates sliding of the plate 2 against the outside 15 of the panel 8.

To further assist the plate 2 in sliding along the back 15 of the panel 8, the front end 40 of the plate 2 is provided with a radius of 12.5 mm and is bent upwards towards the front nut 34 so as to provide a ski effect and prevent the front end 40 from digging into the panel 8. As long the plate 2 is moving and tearing through the body panel 8, energy is being absorbed.

The load securing bracket 60, as shown in FIGS. 4 and 5, has a first end portion 62 for bolting to the body panel 8, a second end portion 64 for bolting to the load carrying frame 4, and a bridging portion 66 disposed therebetween. The load securing bracket is 5 mm thick, made of mild steel with a yield strength of 250 to 350 MPa. The first end portion 62 has a width of 32 mm, length of 40 mm and is bolted to the inside 14 of the body panel 8 by the load bolt 16 via a hole 68 of 11 mm diameter. The second end portion 64 is 18 mm wide, 25 mm long and may be bolted or welded to the side of a load carrying frame 12, via a hole 70 of 9 mm diameter. The end portions 62 and 64 define planes which are substantially parallel with resect to one another, and the bridging portion 66 defines a plane which is disposed at approximately 85° to the other planes. The joins between the bridging portion 66 and the end portions 62 and 64 have corner radiuses of at least 3 mm.

The bracket 60 is matched to the body panel 8 and the anchor plate 2. If the bracket is too stiff it will cause premature failure of the load restrains system by pulling the anchor plate 2 through the panel 8. The thickness of the bracket 60 has been chosen to enable significant energy absorption by allowing deformation of the bracket 60 under load impact conditions, thereby reducing the load transmitted to the anchor plate 2 and its securing bolt 16 and screws 18 and 20.

The load restraint system using the anchor plate 2 has tested and proven to be particularly advantageous. Anchorage systems using presently available anchor plates have only been able to withstand up to 1150 kg in shear and a pull out force of 700 kg. The anchorage system using the anchor plate 2 is however able to withstand up to 2720 kg in shear, being in the direction 10, and a pull out force of 1740 kg, being in a direction perpendicular to the direction 10.

Figure 11:
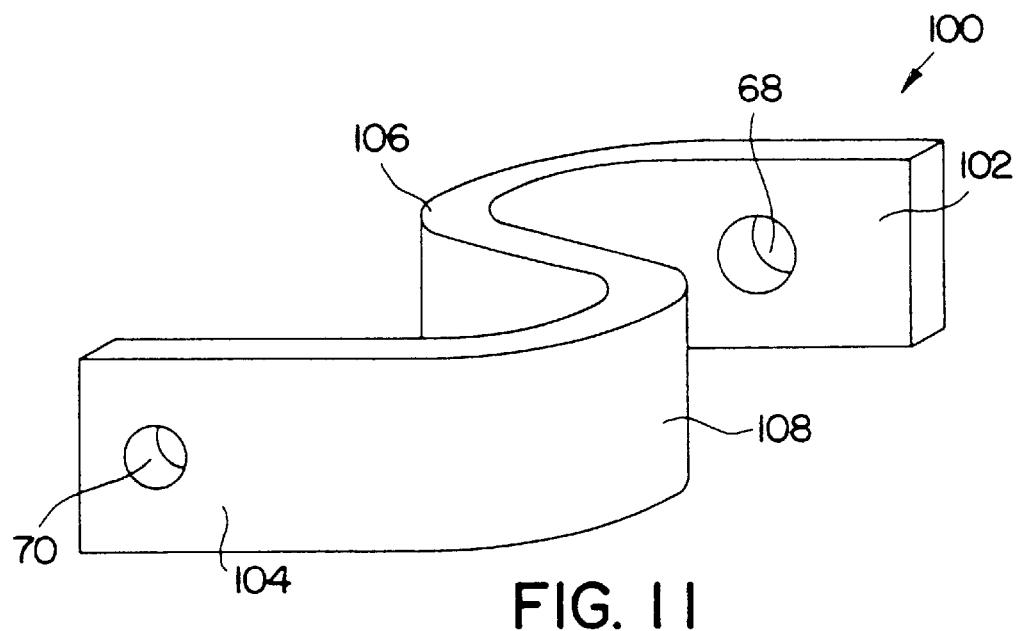
FIG. 11 is a perspective view of a further preferred embodiment of a load securing bracket for use with the anchor plate.
Figure 12:
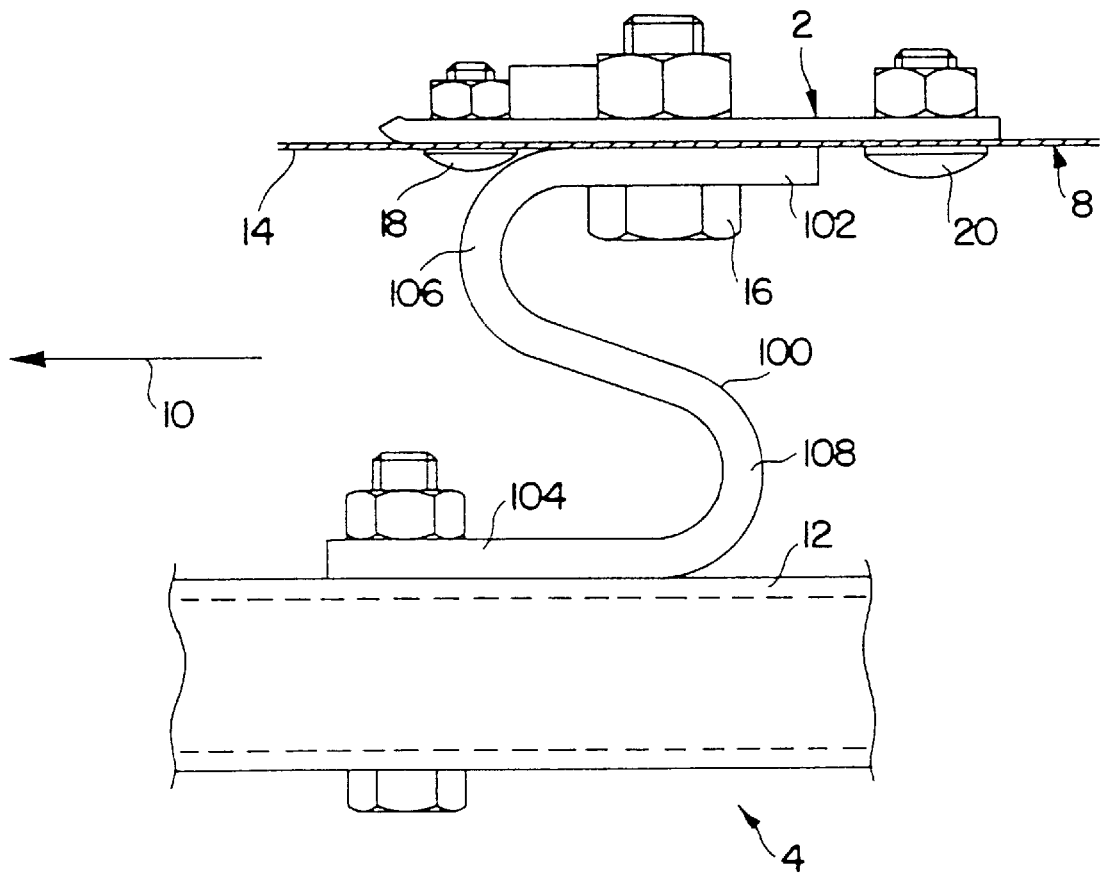
FIG. 12 is a cross-sectional plan view of part of a further preferred embodiment of a load restraint system using the anchor plate.
Figure 13:
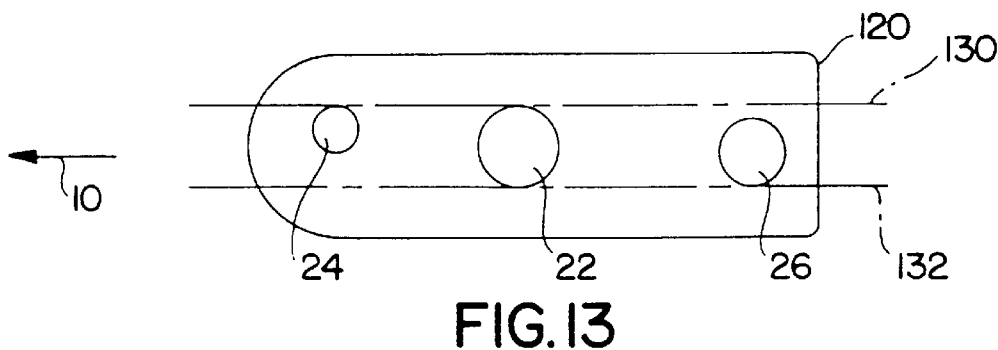
FIGS. 13 to 16 are schematic diagrams illustrating further preferred embodiments of the anchor plate.
Figure 14:
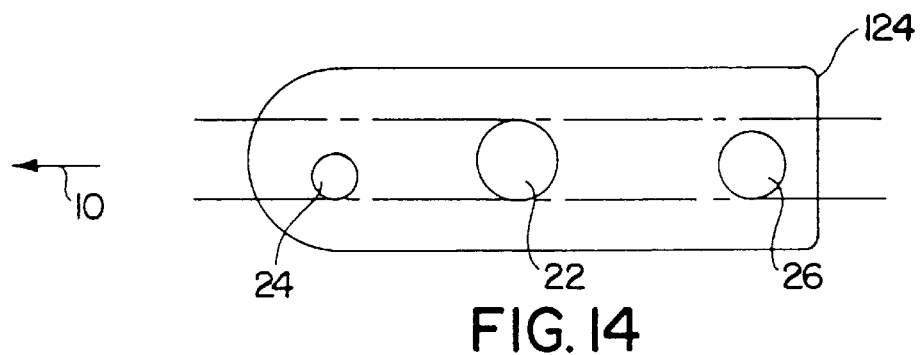
Figure 15:
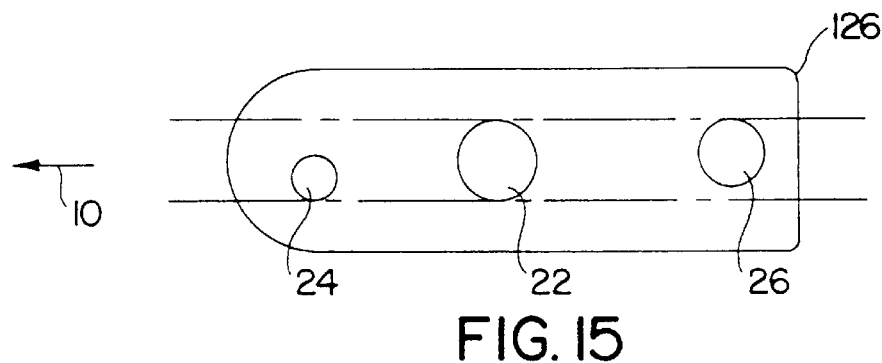
Figure 16:
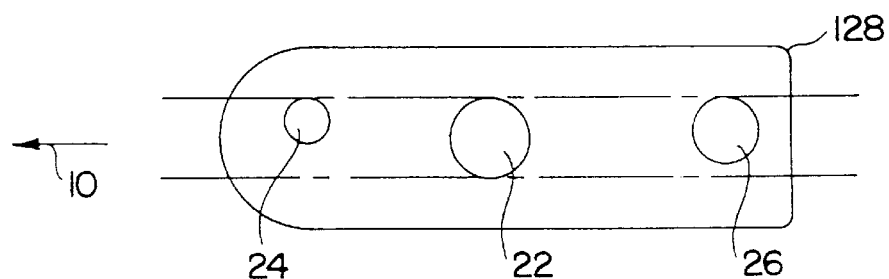

An alternative load restraint system as shown in FIG. 12 is the same as that illustrated in FIG. 6, except it includes an S-shaped load securing bracket 100, as shown in FIGS. 11 and 12. The end portions 102 and 104 of the bracket 100 are still parallel to one another and are secured to the inside 14 of the vehicle body panel 8 and the load carrying frame 4, respectively. The bracket 100 however presents an S-shaped profile between the end portions 102 and 104 instead of having relatively planar middle portion 66 connected between the end portions. The securing bracket 100 is particularly advantageous as it increases the size of an impact load in the direction 10 which the load restraint system is able to withstand. The bracket 100 is able to undergo a greater and smoother deformation when the load impact imparts a deforming force on the bracket 100. Due to the rounded bends 106 and 108 which meet the end portions 102 and 104 and from the middle portion of the bracket 100, there is also less possibility for the induction of cracking in the bracket 100, which can occur in the sharper corner joins between the middle portion 66 and the end portions 62 and 64 of the bracket 60 of FIGS. 4 and 5. The bracket 100 is able to absorb a greater deformation force than that of the bracket 60 of FIGS. 4 and 5.

FIGS. 13 to 16 illustrate how the holes 22, 24 and 26 can be laterally offset with respect to one another to produce different yet still effective embodiments 120 to 128 of the anchor plate 2. The second and third holes 24 and 26 can be offset with respect to the centre hole 22, provided they are still aligned with the centre hole 22 on the plate 120 to 128, such that the perimeters of the second and third holes 24 and 26 do not extend beyond bounding tangent lines 130 and 132, which are tangents to the perimeter of the centre hole 22 and are substantially parallel with the longitudinal axis of the vehicle and the direction 10. The holes 22 to 26 do not need to be aligned with any axis of the plates 2, 120, 124 and 126, as they only need to be aligned with respect to one another on the plate so as to produce the progressive tearing affect, described with reference to FIGS. 7 to 10, when a load induces an impact force in the direction 10.

I claim:

1. An anchor plate for a load restraint system, comprising an elongate plate member including first, second and third substantially circular holes aligned on the plate and for receiving respective means for fixing the plate to a vehicle body panel, said second hole being disposed between said first and third holes, and closer to the first hole than the third hole, said second hole having a larger diameter than the first and third holes, said plate includes first, second and third nuts aligned with the first, second and third holes, respectively; said first hold is directed to the front of the vehicle and the third hole is directed to the rear of the vehicle when the anchor plate is affixed thereto.

2. An anchor plate as claimed in claim 1, wherein the third hole has a larger diameter than the first hole.

3. An anchor plate as claimed in claim 1, wherein the front end of the plate is bent upwards, and away from the vehicle body panel when mounted thereto.

4. An anchor plate as claimed in claim 1, including stiffening means between said first and second nuts.

5. An anchor plate for a load restraint system mounted on the outside of an inner vehicle body panel, said plate including: an elongate member having first, second and third holes, aligned on the plate, said second hole being disposed between said first and third holes, and closer to the first hole than the third hole, and said first hole being directed to the front of the vehicle and the third hole being directed to the rear of the vehicle; and first, second and third nuts aligned with the first, second and third holes, respectively, for receiving respective fixing means which fix the anchor plate to said inner vehicle body panel, and second hole and second nut having a larger diameter than the first and third holes and nuts.

6. An anchor plate as claimed in claim 5, wherein the third hole and nut have a larger diameter than the first hole and nut.

7. An anchor plate as claimed in claim 5, wherein the front end of the plate is bent upwards, and away from the vehicle body panel.

8. An anchor plate as claimed in claim 5, including stiffening means between said first and second nuts.

9. An anchor plate as claimed in claim 5, wherein the fixing means include a bolt for said second hole and nut and bolts for said first hole and nut and said second hole and nut.

* * * * *

UNITED STATES PATENT AND TRADEMARK OFFICE
CERTIFICATE OF CORRECTION

PATENT NO. : 5,906,410
DATED : May 25, 1999
INVENTOR(S) : Dalinkiewicz

It is certified that error appears in the above-identified patent and that said Letters Patent is hereby corrected as shown below:

Title page,
Item [62], delete "Division of application No. 08/488,610, Jun 8, 1995, abandoned." and insert -- Division of application No. 08/488,610, June 8, 1995, now U.S. Patent No. 5,909,920 issued June 8, 1999. --.

Signed and Sealed this

Eighteenth Day of December, 2001

Attest:

Attesting Officer

JAMES E. ROGAN
Director of the United States Patent and Trademark Office